(12) United States Patent
McMurtry et al.

(10) Patent No.: US 7,254,506 B2
(45) Date of Patent: Aug. 7, 2007

(54) METHOD OF CALIBRATING A SCANNING SYSTEM

(75) Inventors: David Roberts McMurtry, Dursley (GB); Geoffrey McFarland, Dursley (GB)

(73) Assignee: Renishaw, PLC, Gloucestershire (GB)

(*) Notice: Subject to any disclaimer, the term of this patent is extended or adjusted under 35 U.S.C. 154(b) by 149 days.

(21) Appl. No.: 10/518,364

(22) PCT Filed: Jul. 4, 2003

(86) PCT No.: PCT/GB03/02872

§ 371 (c)(1),
(2), (4) Date: Dec. 17, 2004

(87) PCT Pub. No.: WO2004/005849

PCT Pub. Date: Jan. 15, 2004

(65) Prior Publication Data

US 2005/0213108 A1 Sep. 29, 2005

(30) Foreign Application Priority Data

Jul. 4, 2002 (GB) .................................. 0215478.9

(51) Int. Cl.
*G01B 21/04* (2006.01)
(52) U.S. Cl. ..................... 702/95; 33/502; 33/504; 33/553; 702/168
(58) Field of Classification Search ............ 702/95, 702/168; 73/1.79; 33/502–504, 546, 553–555
See application file for complete search history.

(56) References Cited

U.S. PATENT DOCUMENTS

| 4,991,304 | A | * | 2/1991 | McMurtry ............... 33/504 X |
| 5,594,668 | A | * | 1/1997 | Bernhardt et al. ........... 702/95 |
| 6,131,301 | A | | 10/2000 | Sutherland ................. 33/561 |
| 6,810,597 | B2 | * | 11/2004 | Grzesiak et al. ............. 33/503 |
| 7,133,793 | B2 | * | 11/2006 | Ely et al. ................. 702/95 X |
| 7,146,291 | B2 | * | 12/2006 | Hough ................... 702/168 X |
| 2001/0025427 | A1 | | 10/2001 | Lotze et al. ................. 33/559 |
| 2006/0266100 | A1 | * | 11/2006 | McMurtry et al. ........... 73/1.79 |

FOREIGN PATENT DOCUMENTS

| EP | 0 318 557 A1 | 12/1988 |
| WO | WO 00/25087 A1 | 5/2000 |
| WO | WO 00/62015 A1 | 10/2000 |
| WO | WO 0062015 A1 * | 10/2000 |

* cited by examiner

*Primary Examiner*—Thomas P. Noland
(74) *Attorney, Agent, or Firm*—Oliff & Berridge, PLC (57) ABSTRACT

A method of measuring an object on a coordinate positioning apparatus. A first object is placed on a coordinate positioning apparatus and measured with a workpiece contacting probe to create measurement data. The measurement data is collected at multiple stylus deflections or probe forces. For a plurality of points on the surface of the first object, the measurement data is extrapolated to that corresponding to zero stylus deflection or zero probe force. An error function or map is created from the measurement data and the extrapolated data. Subsequent objects are then measured using a known stylus deflection or known probe force and the error function or map is used to apply an error correction to these measurements.

15 Claims, 9 Drawing Sheets

METHOD OF CALIBRATING A SCANNING SYSTEM

The present invention relates to a method of calibrating a scanning system. A scanning system in this specification should be understood to mean a combination of a machine and a probe which together are capable of use in scanning an object in order to obtain information about its size, shape or surface contours.

BACKGROUND

The machine may be, for example, a co-ordinate measuring machine (CMM), machine tool or robot etc, and the probe is a measuring probe with a workpiece-contacting stylus. One type of machine has measuring devices for measuring the movement of the machine parts in three nominally orthogonal directions (referred to as X,Y and Z axes), and one type of probe includes measuring transducers for producing outputs indicative of the displacement of the tip of the stylus relative to the probe in three nominally orthogonal directions (referred to as the a,b, and c axes). Although the term 'analogue probe' is used, the outputs for the a,b and c axes may be either analogue or digital.

In known systems, measurement errors are caused by unwanted deflections of the probe, machine structure and workpiece. Errors due to bending of the probe stylus are the same throughout the machine volume and may be compensated for by probe calibration. Errors due to deflections in the machine structure may be caused, for example, by the machine quill bending and the machine bridge twisting and vary throughout the machine volume. These errors increase, for example, with increasing cantilevers. Errors in the object to be measured may be caused by object deflection during measurement as a result of force by the probe.

Parts of the working volume of the machine may be calibrated for measurement errors by using a calibration artefact such as a calibration sphere. However usually the calibration artefact cannot be located at the same position in the machine's working volume as the part to be measured and is instead located to one side. The measurement errors determined at the calibration artefact will thus be different to those on the part.

Methods of correcting machines for acceleration induced errors are known. One example of such a method is described in European Patent No. 318557. In this method a first article from a batch of nominally identical articles is measured at a relatively slow speed, noting the measurements of the positions of a number of datum points on the article. The measurement operation is repeated at a relatively fast speed noting the measurements of the positions of the same datum points. Any difference in the measurements are noted as errors in a correction table.

Thereafter all of the articles are measured at the relatively fast speed taking measurements of the positions of corresponding points on each article, and these measurements are corrected for machine accelerations using the previously noted errors.

Another method of correcting errors is disclosed in WO00/62015. In this method a stylus of a probe mounted on a coordinate measuring machine is driven into contact with a surface of an object in a direction normal to its surface until a predetermined stylus deflection has been reached. The machine is then reversed whilst simultaneously recording the outputs of the machine measuring devices and measuring transducers of the probe. This process is repeated for a selection of datum points around the surface of the object.

The measurements for each datum points are extrapolated to determine the measurement which would have been taken when the probe deflection is zero. This extrapolated value relates to when the probe is just in contact with the surface.

The object is then scanned at a slow speed and predetermined stylus deflection. The difference at the datum points between the initial measurements and the scan is recorded.

The scans are repeated at the same stylus deflection at greater speeds until the variation in the recorded differences between the fast scan and the initial measurements and the slow scan and the initial measurements exceeds a defined tolerance. The last speed which falls within this tolerance is the maximum scanning speed. A map of the positional errors at the datum points is stored along with the data relating to the scanning speed, particular artefact, particular CMM and probe and stylus configuration etc. It is possible to interpolate from this map to obtain radial errors at angles in between the radial directions at which actual data was obtained (i.e. the datum points).

This method has the disadvantage that the step of collecting the datum points is time consuming.

SUMMARY

The present invention provides a method of measuring an object on a coordinate positioning apparatus, comprising the following steps, in any suitable order:

placing a first object on a coordinate positioning apparatus;

measuring said first object with a workpiece contacting probe to create measurement data of the first object, the measurement data being collected at multiple stylus deflections or probe forces;

for a plurality of points on the surface of said first object, extrapolating the measurement data to that corresponding to zero stylus deflection or zero probe force;

creating an error function or map from said measurement data and the extrapolated data;

measuring subsequent objects at a known stylus deflection or known probe force;

and using the error function or map to apply an error correction to the measurements of said subsequent objects.

The term measuring includes taking measurements using either a scanning probe or a touch trigger probe.

The known stylus deflection or probe force may be a known constant deflection or force or a known varying deflection or force.

Preferably the step of measuring the first object with a workpiece contacting probe comprises scanning the first object.

The first object may be a part in a series of substantially identical parts or an artefact with features approximating those of a series of parts to be measured.

Preferably the first object is measured for each measurement run at a slow speed. The error map is thus a measure of measurement force errors.

In a first embodiment, the first object is measured at a slow speed, and further comprises the additional steps of:

measuring said first object with a workpiece contacting probe at a fast speed to create measurement data of the first object, the probe having a known stylus deflection or known probe force;

comparing the extrapolated measurement data corresponding to zero stylus deflection or zero probe force at the slow speed with the measurement data at the fast speed;

wherein the error function or map created from the measurement data relates to the measurement data at the fast speed;

and wherein the subsequent objects are measured at a known stylus deflection or known probe force at the fast speed.

In a second embodiment, the first object is measured at a fast speed and further comprises the additional steps of:

creating a first error function or map from the difference between the measurement data at a predetermined stylus deflection or probe force at said fast speed and the extrapolated to zero data at the fast speed;

measuring said first object with a workpiece contacting probe at a slow speed to create measurement data of the first object;

applying the first error function or map to the measurement data created during the slow measurement run using said predetermined stylus deflection or known probe force;

wherein said error function or map comprises a second error function or map relating to the difference between the measurement data obtained during the fast measurement at said predetermined known stylus deflection or known probe force and the measurement data corresponding to zero stylus deflection or zero probe force at said slow speed;

and wherein the subsequent objects are measured at a known stylus deflection or known probe force at the fast speed.

A second aspect of the invention provides a method of measuring an object on a coordinate positioning apparatus, comprising the steps of:

placing a first object on a coordinate positioning apparatus;

measuring said first object with a workpiece contacting probe at a slow speed to create measurement data of the first object, the measurement data being collected at multiple stylus deflections or probe forces;

for a plurality of points on the surface of said first object, extrapolating the measurement data to that corresponding to zero stylus deflection or zero probe force at said slow speed;

measuring said first object with a workpiece contacting probe at a fast speed to create measurement data of the first object, the probe having a known stylus deflection or known probe force;

comparing the extrapolated measurement data corresponding to zero stylus deflection or zero probe force at a slow speed with the measurement data at a fast speed;

creating an error function or map from the comparison of measurement data;

measuring subsequent objects at a known stylus deflection or known probe force at the fast speed;

and using the error function or map to apply an error correction to the measurements of said subsequent objects.

The error function or map corresponds to both measurement force errors and dynamic errors caused by the probe moving at fast speed.

A third aspect of the invention provides a method of measuring an object on a coordinate positioning apparatus comprising in any suitable order, the steps of:

(a) placing a first object on a coordinate positioning apparatus;

(b) measuring said first object for a measurement run with a workpiece contacting probe at a fast speed to create measurement data of the first object, the measurement data being collected at multiple stylus deflections or probe forces;

(c) for a plurality of points on the surface of said first object, extrapolating the measurement data from step (b) to that corresponding to zero stylus deflection or zero probe force at the fast speed;

(d) creating a first error function or map for the relationship between measurement force error and stylus deflection or probe force from the measurement data obtained in step (b) and the extrapolated to zero data at said fast speed in step (c);

(e) measuring said first object with a workpiece contacting probe at a slow speed to create measurement data of the first object, the probe having a known stylus deflection or known probe force;

(f) applying the first error function or map of step (d) to the measurement data created during the measurement run in step (e) and thereby determining the measurement data of the first object corresponding to zero stylus deflection or zero probe force at the slow speed;

(g) creating a second error function or map relating to the relationship between the measurement data obtained at a fast speed for a known stylus deflection or probe force and the measurement data corresponding to zero stylus deflection or zero probe force at said slow speed determined in step (f);

(h) measuring subsequent objects at a known stylus deflection or known probe force and fast speed; and (i) using the second error function or map created in step (g) to apply an error correction to the measurements obtained in step (h).

The error function or map corresponds to both measurement force errors and dynamic errors caused by the probe moving at fast speed.

A fourth aspect of the present invention provides a method of measuring an object on a coordinate positioning apparatus, comprising the steps of:

placing a first object on a coordinate positioning apparatus;

measuring said first object with a workpiece contacting probe to create measurement data of the first object, the measurement data being collected at multiple probe forces;

for a plurality of points on the surface of said first object, extrapolating the measurement data to that corresponding to zero probe force;

creating an error function or map;

measuring subsequent objects at a known probe force;

and using the error map to apply an error correction to the measurements of the subsequent objects.

In each of the preceding aspects of the invention, the first object may comprise an artefact having features of known form corresponding to features on the subsequent objects, wherein the method includes the step of comparing the extrapolated to zero data of said first object with its known form and thereby creating a function or map of the geometric errors of the machine and probe.

BRIEF DESCRIPTION OF THE DRAWINGS

Preferred embodiments of the invention will now be described with reference to the accompanying drawings in which.

DETAILED DESCRIPTION OF EMBODIMENTS

Figure 1:
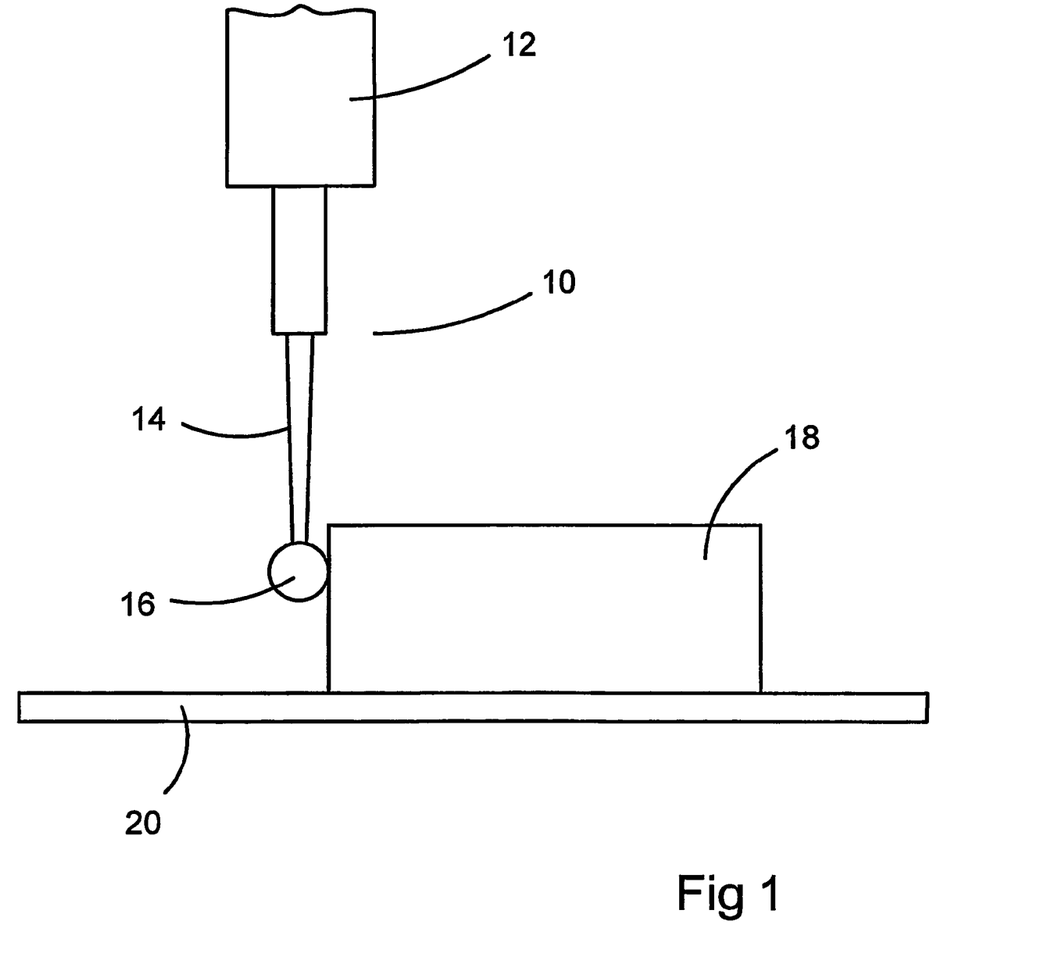
FIG. 1 is a schematic diagram of an analogue probe mounted on a coordinate measuring machine.
Figure 2:
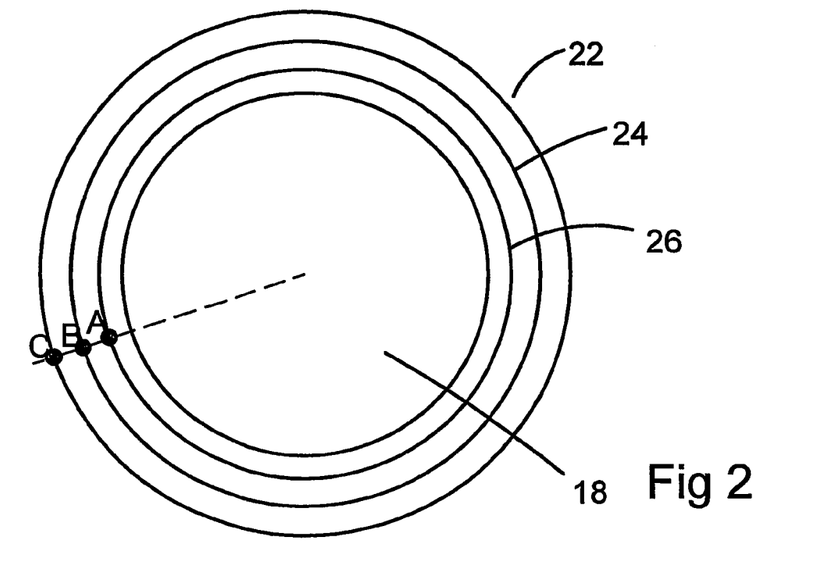
FIG. 2 is a schematic representation of several different constant stylus deflection scans around an object.
Figure 3:
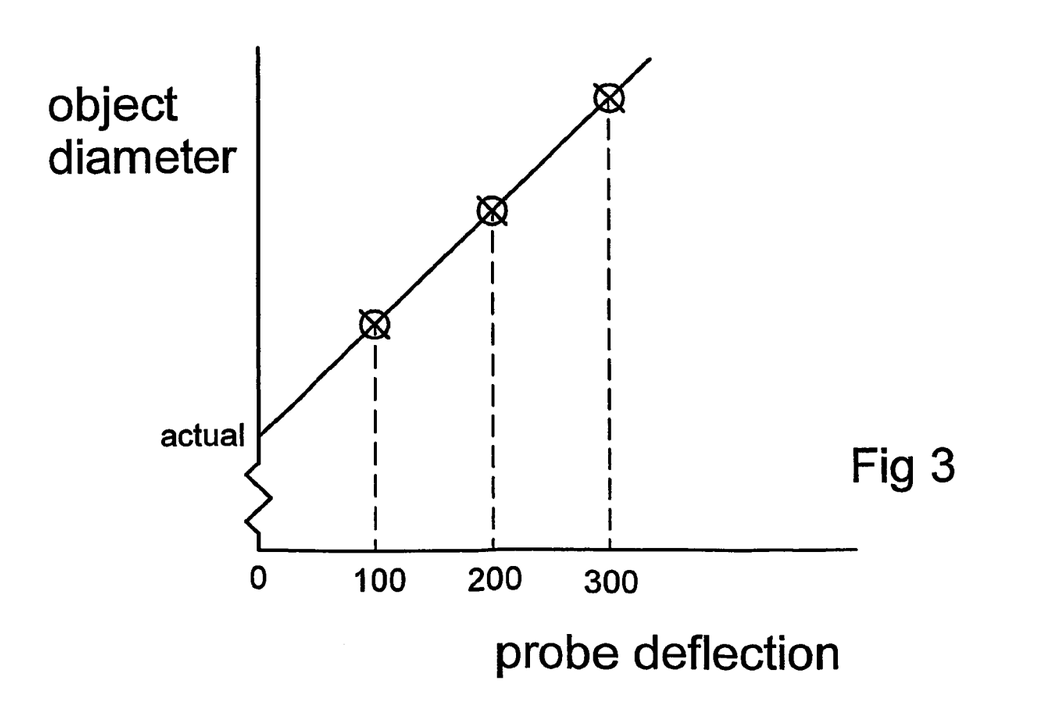
FIG. 3 is a graph illustrating probe deflection against object diameter.

In a first step of the invention, a measurement force error map is generated for an object. This is achieved by mounting an analogue probe 10 on the quill 12 of a coordinate measuring machine (CMM) (not shown) as illustrated in FIG. 1. The analogue probe 10 has a deflectable stylus 14 with a workpiece contacting tip 16. The object 18 to be measured is mounted on the CMM machine table 20 and the probe 10 is driven slowly by the machine quill 12 in a path around the object. The object 18 is first scanned along a path at a first constant probe deflection, for example 300 μm. The object is then scanned along this path at one or more different subsequent probe deflections. For example, the part may be scanned a second time with a probe deflection of 200 μm and a third time with a probe deflection of 100 μm. FIG. 2 shows a representation of the object 18 and the measurements obtained from the first 22, second 24 and third 26 scans around it. Each point on the object 18 will thus have three different measurements A, B, C, resulting from the three different scans at different probe deflections. For each point on the object, the measurements may be extrapolated back to calculate the measurement which would have been taken if the probe deflection was zero. FIG. 3 shows a graph of the probe deflection against object diameter. The actual object diameter is shown at zero probe deflection. The step of extrapolating to zero probe deflection allows the measurements at zero probe deflection to be determined without the errors of actual measurement, caused by probing force errors. A passive probe is suitable for use in this method, such a probe may comprise a stylus deflectable against springs.

This information enables a measurement force error map of the part to be produced. If the scans of the part were taken at a slow speed, this results in negligible dynamic errors due to very low accelerations of the probe and machine.

Figure 4:
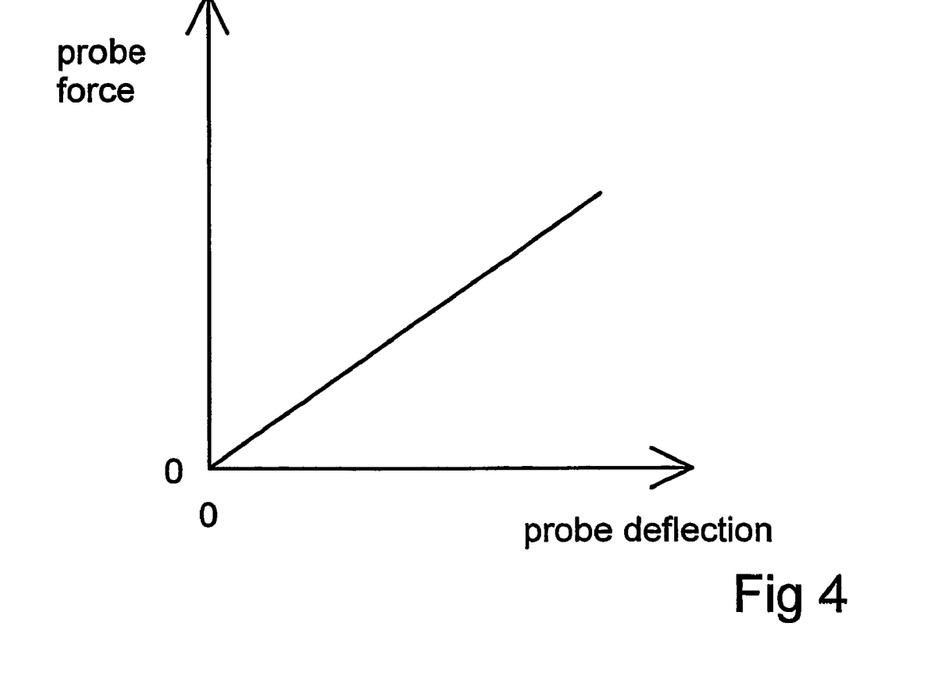
FIG. 4 is a graph illustrating probe force against probe deflection.

FIG. 4 shows the relationship of probe force against probe deflection. The probe acts within Hook's law such that when there is zero probe force, there is zero probe deflection.

Figure 5:
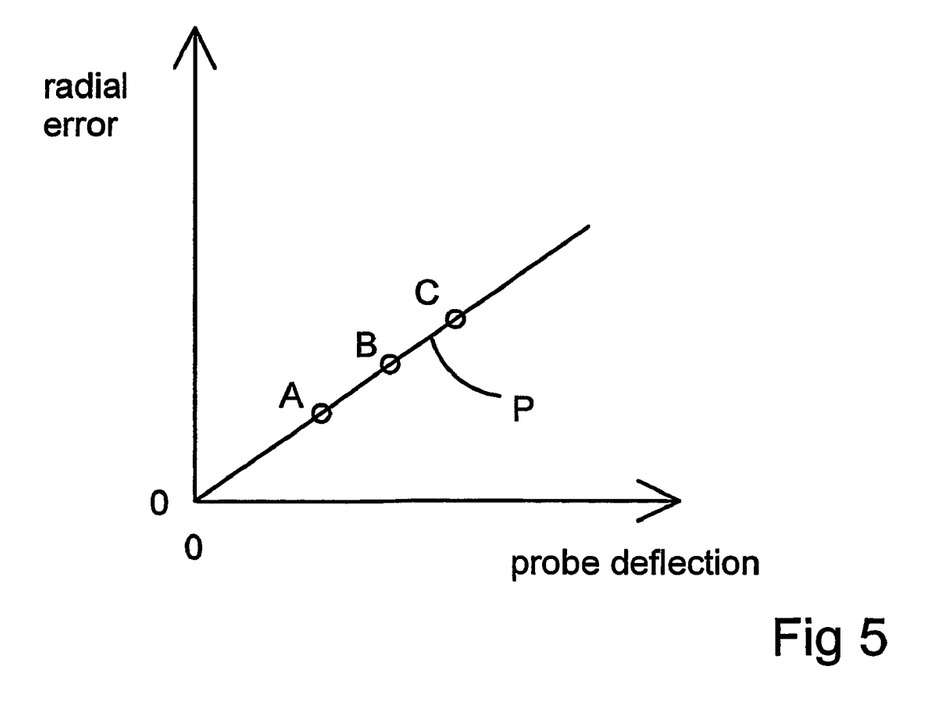
FIG. 5 is a graph illustrating the radial error against probe deflection

FIG. 5 illustrates the relationship of radial error against probe deflection. Points A,B and C relate to the radial error at probe deflection 100 μm, 200 μm and 300 μm respectively. By using these points to extrapolate to zero probe deflection, zero radial error is achieved. Once the function relating probe deflection and radial error has been determined, a subsequent measurement taken at any probe deflection, for example point P, may be corrected to zero radial error using this function. As there is a linear relationship between probe deflection and radial error, the function for correcting measurements at a given probe deflection is also linear.

Alternatively the measurement force error may be in the form of an error map. This could be in the form of a look-up table, with different error corrections for different stylus deflections. The error map could be in the form of a polynomial function.

Figure 6:
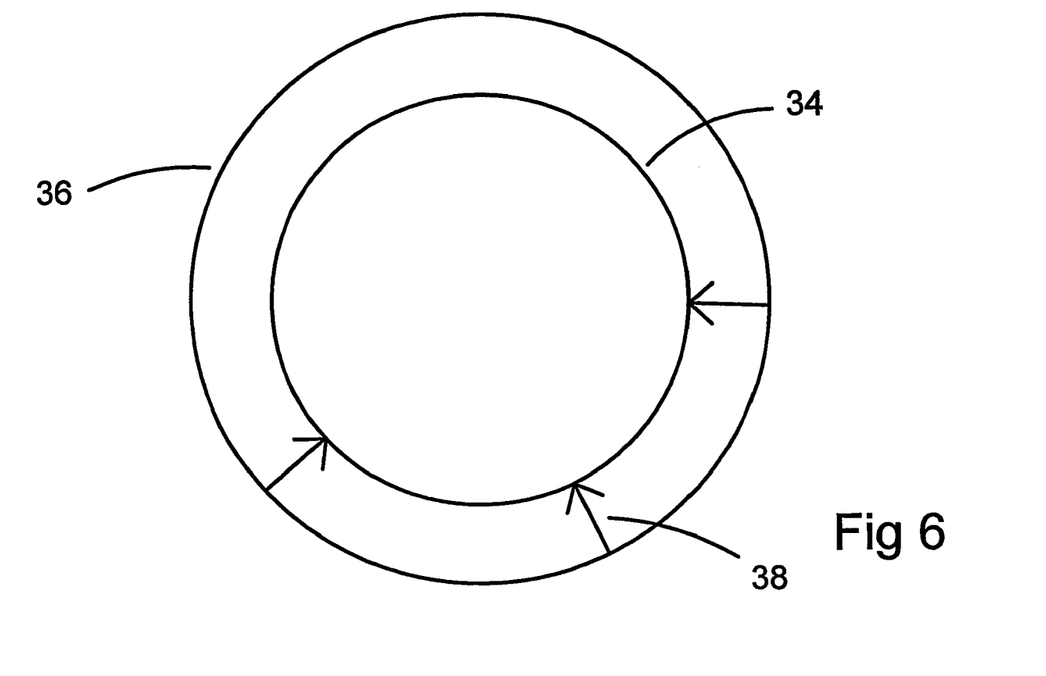
FIG. 6 is a schematic illustration of the static correction vectors.

FIG. 6 shows the error corrections for points on the scan. Each point on the scan has a different radial correction 38 which is applied for a certain stylus deflection. If a subsequent object is scanned at a stylus deflection of 300 μm 36, the measurement force error function or map may be used to correct the measured dimensions 36 taken at this stylus deflection to the actual part dimensions 34 corresponding to the part being scanned at a deflection of 0 μm.

Figure 16:
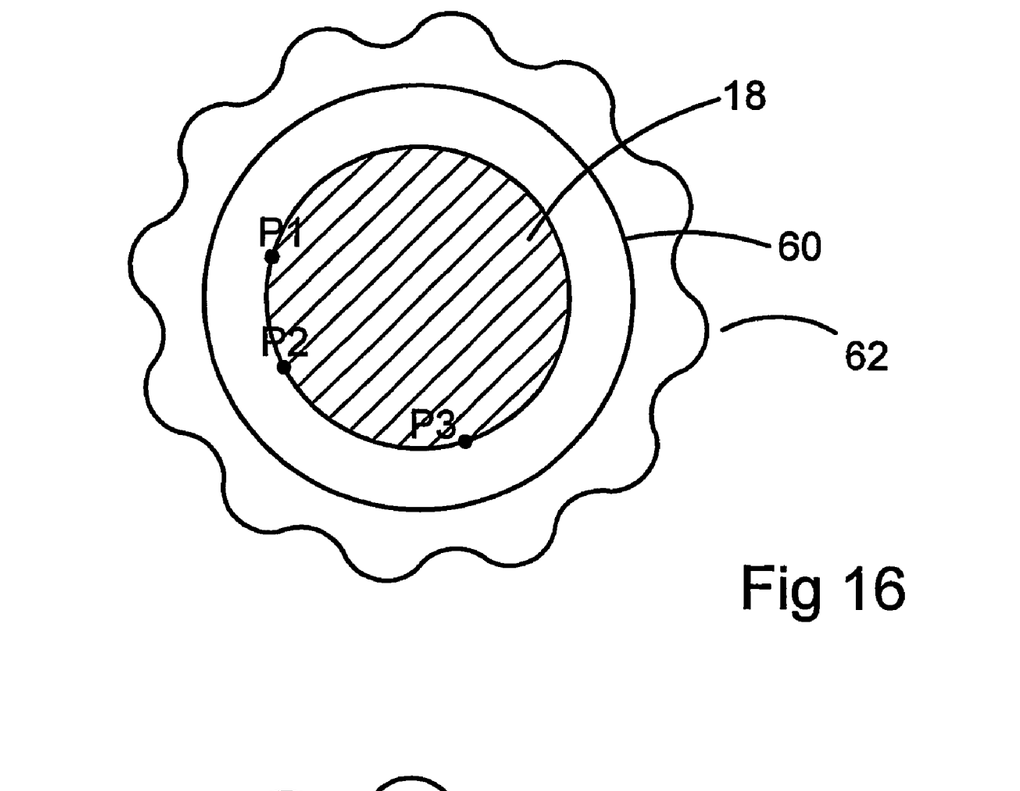
FIG. 16 is a schematic representation of a scan with a sinusoidally varying stylus deflection around an object.

This method is not limited to each scan having a constant deflection, as long as points on the object surface have measurement data corresponding to different stylus deflections to enable the measurement data to be extrapolated to zero. For example, FIG. 16 illustrates a first scan profile 60 around an object 18 taken at constant deflection and a second scan profile 62 taken using a sinusoidally varying deflection. Points P1, P2, P3 on the object surface thus each have two measurements taken at different probe deflections. This measurement data may be extrapolated to zero as previously described.

Figure 17:
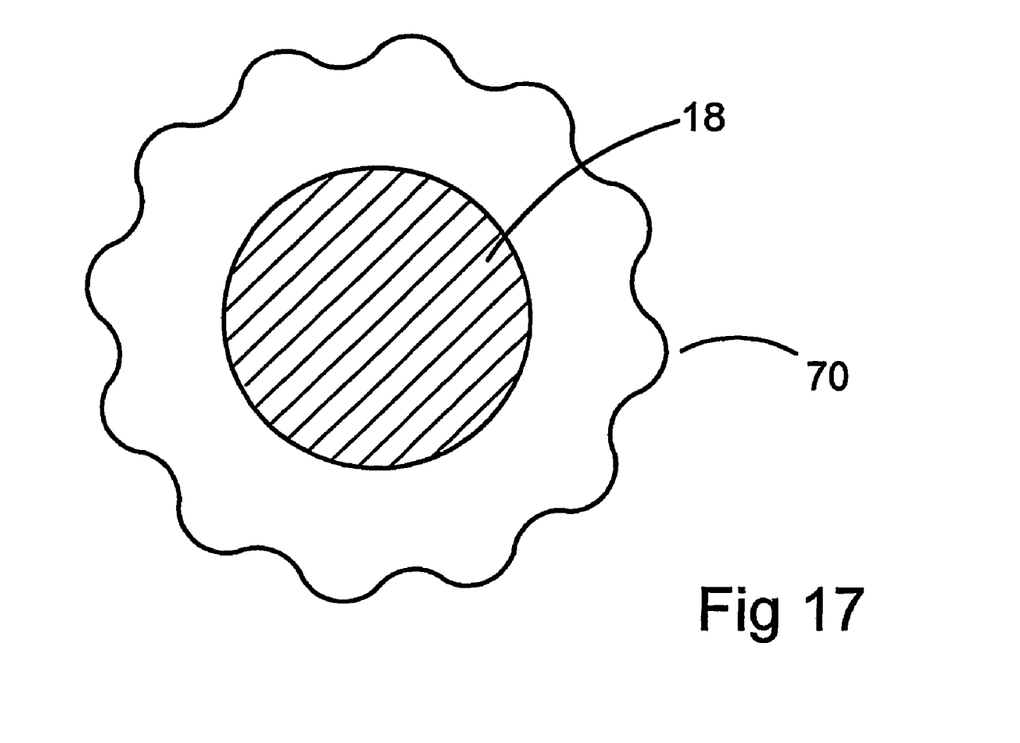
FIG. 17 is a schematic representation of a scan with a single sinusoidally varying stylus deflection around an object.
Figure 18:
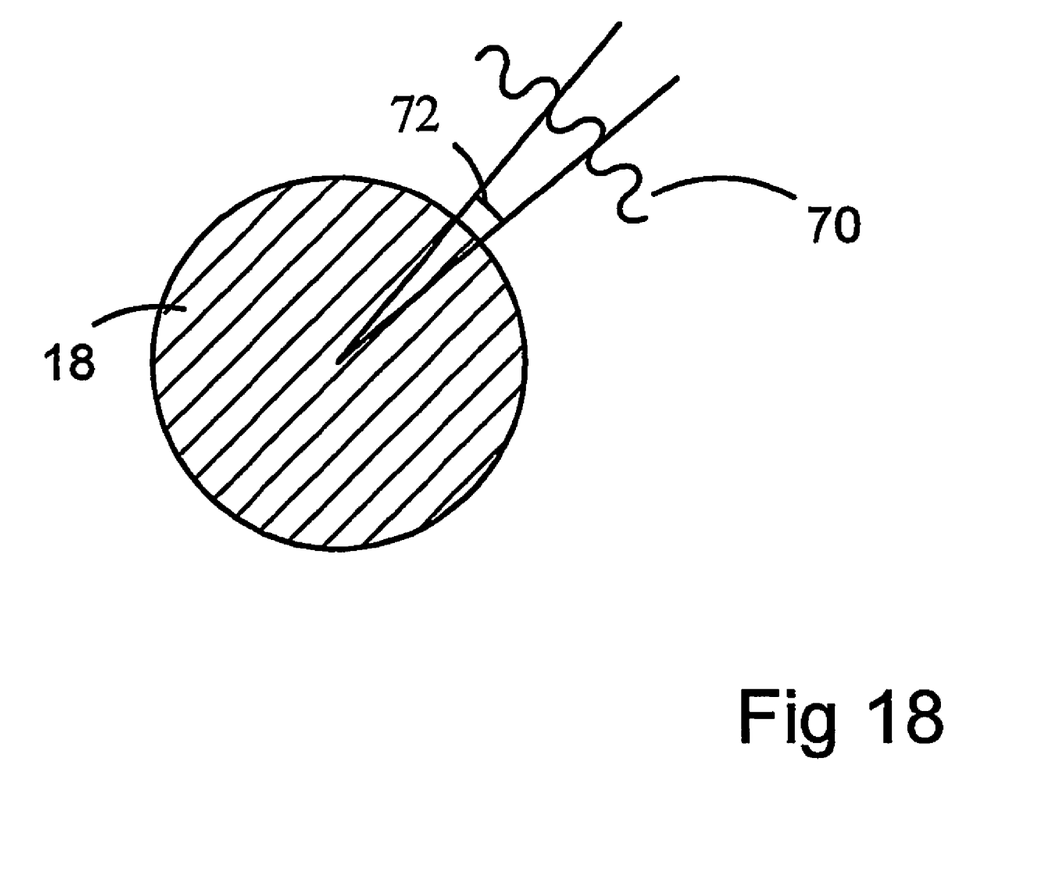
FIG. 18 illustrates a section of the scan profile of FIG. 17.

It is also possible to collect sufficient measurement data during a single varying scan profile. FIG. 17 illustrates a single scan profile 70 around an object 18, the scan profile 70 being taken using a sinusoidally varying stylus deflection. FIG. 18 illustrates a section of the scan profile 70. Over a small angle 72, scan profile 70 contains many data points taken at different stylus deflections. Assuming changes in the surface are small over angle 72 (eg part deflection and uniformity of surface), these data points taken at different stylus deflections over angle 72 may be used for the extrapolation to zero calculation. This is also possible if there is a change in the surface profile over angle 72, as long as the change can be assumed to be linear.

Figure 7:
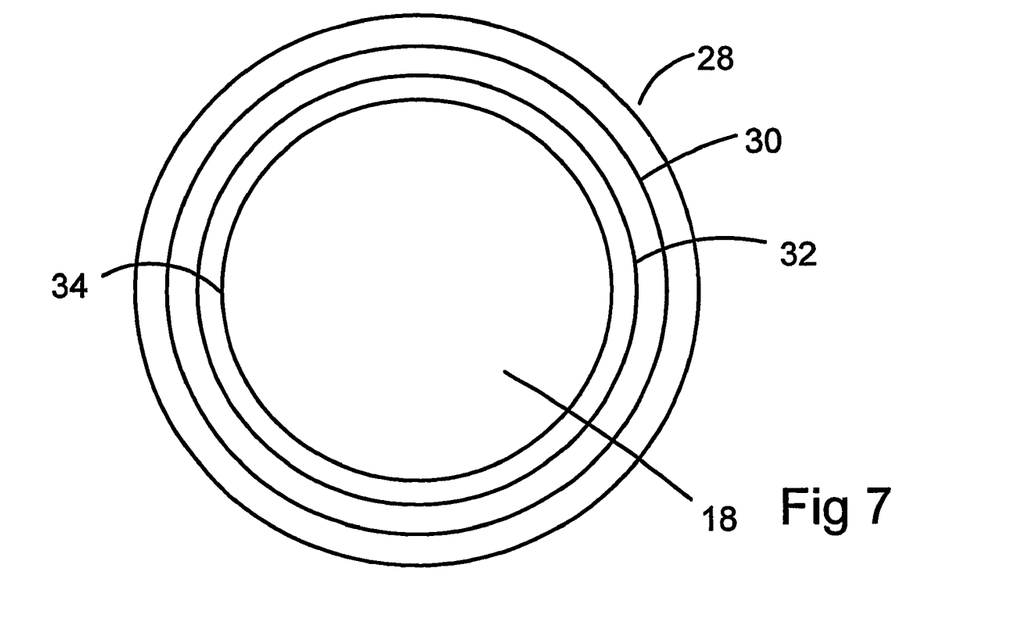
FIG. 7 is a schematic representation of several different constant force scans around an object.

Alternatively, instead of scanning the object several times at different probe deflections, it may be scanned several times with the probe having a different constant force for each scan. For example, the object may be first scanned with a constant force between the stylus and the object of 0.3N. The object may then be scanned a second time with a constant force of 0.2N and a third time with a constant force of 0.1N. Each of these scans may have the same or different stylus deflections. FIG. 7 shows a representation of the object 18 with an actual part dimension 34 and the measured dimensions obtained from the first 28, second 30 and third 32 scans at different constant probe forces.

As before, for a point on the surface of the object, there are three sets of data relating to the scans at different probe forces. This data may be extrapolated back to enable the point which would be measured with zero force between the stylus and workpiece (i.e. the actual part dimensions) to be determined. As described previously, an error function or map may be created relating measurements taken at a given probe force to the correct measurements for a given point determined for zero probe force by the extrapolating to zero technique. Subsequent measurements at a given probe force may be corrected for measurement force errors using this measurement error function or map.

As with the previous method, sufficient data may be collected from a single scan of varying probe force (eg having a sinusoidal profile) to do the extrapolate to zero calculation.

This method is suitable for use in an active scanning probe, in which a motorised mechanism is used to control and modulate the contact force with the component to be measured.

The object may comprise a part of a series of parts to be measured. In this case a measurement force error map of this part is produced by this method. Alternatively, the object may comprise an artefact having features corresponding to the features on the parts to be subsequently measured. These features may be, for example, spheres, ring gauges, plug gauges etc. Use of the artefact allows geometric errors in addition to the probing force measurement errors, to be determined. Geometric errors are errors of the machine and probe, for example non-linearity of the machine scales or the machine axes not being straight. As the forms of the features on the artefact are known, they may be used to correct for geometric errors of the machine and probe. This may be done by comparing the extrapolated to zero data of the artefact with the known form of the artefact and producing a geometric error map to correct subsequent parts with.

This method has the advantage that the errors due to probing force measurement errors and geometric errors can be separated. This would not be the case if, for example, measurement data from a scan with 300 μm deflection is compared with the known form of the artefact. In this case the probing force measurement error and geometric error would be combined into one correction and it would not be possible to separate them.

This method of correcting for separate measurement force errors and geometric errors has the advantage that it takes into account the errors due to deflection of the object being measured. Objects with low stiffness and/or thin walls may deflect with the probing force whilst being measured.

Figure 8:
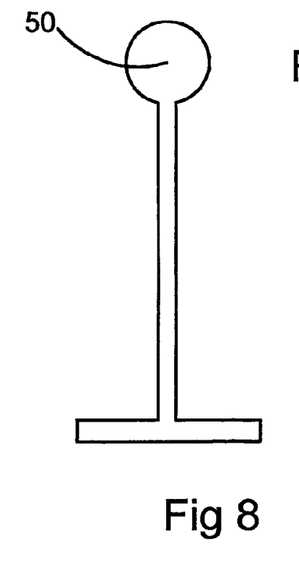
FIGS. 8-10 are schematic illustrations of a feature being deflected under measurement force.
Figure 9:
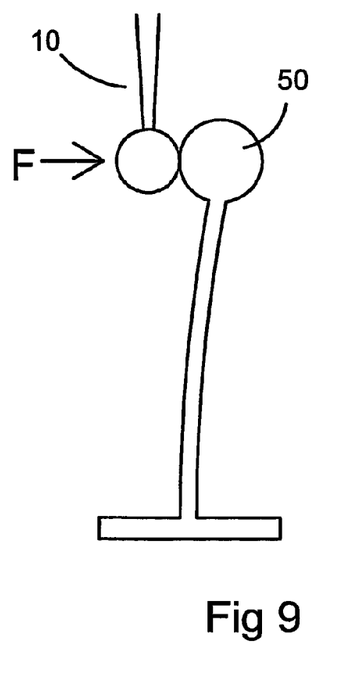
Figure 10:
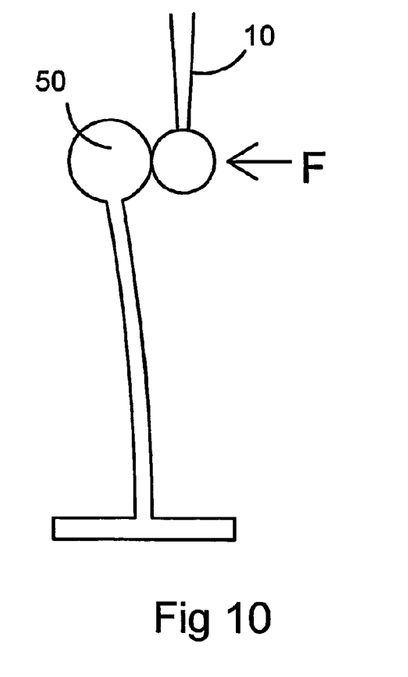
Figure 11:
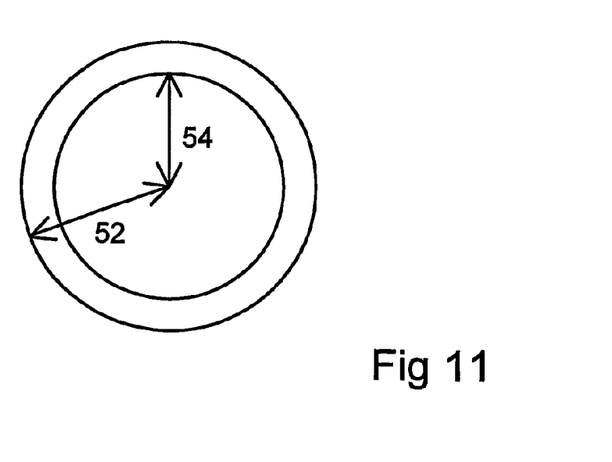
FIG. 11 illustrates the real diameter and the measured diameter of a feature having low stiffness.

FIG. 8 illustrates a feature 50 to be measured which has low stiffness. When the feature is contacted with a probe 10, as shown in FIGS. 9 and 10, the feature deflects away from the probe. This deflection of the feature caused its diameter measured at force F to appear smaller than its actual diameter. FIG. 11 illustrates the actual diameter 52 of the feature and the measured diameter 54 using a probe force F. Similarly, the inner diameter of a ring would appear larger than its actual diameter for the same reason. At zero probe deflection or zero probe force there will be zero deflection of the feature. Thus the measurement force error function or map created by the method of this invention takes account of these errors by this extrapolating to zero step.

In a second step of the invention, the dynamic errors of the system are determined. Dynamic errors may be caused, for example, by machine bending due to acceleration. Once the measurement force error function or map has been produced as described above, the object is scanned at a high speed. The high speed scan is carried out at either constant probe deflection or constant force, as above. In addition, the high speed scan is preferably performed at a constant speed. The measurement data from this fast scan is compared with the measurement force error corrected slow scan relating to the actual dimensions of the object, produced as described in the first step of the invention. A dynamic error function or map may be produced by comparing the fast scan and the measurement error corrected slow scan. This dynamic error map is used to correct subsequent scans taken at a fast speed.

The subsequent scans do not need to have the same stylus deflection or probe force as the original fast scans as the dynamic error function relates the error to the deflection or force. However it is desirable to use a similar fast speed for the subsequent scans.

Figure 12:
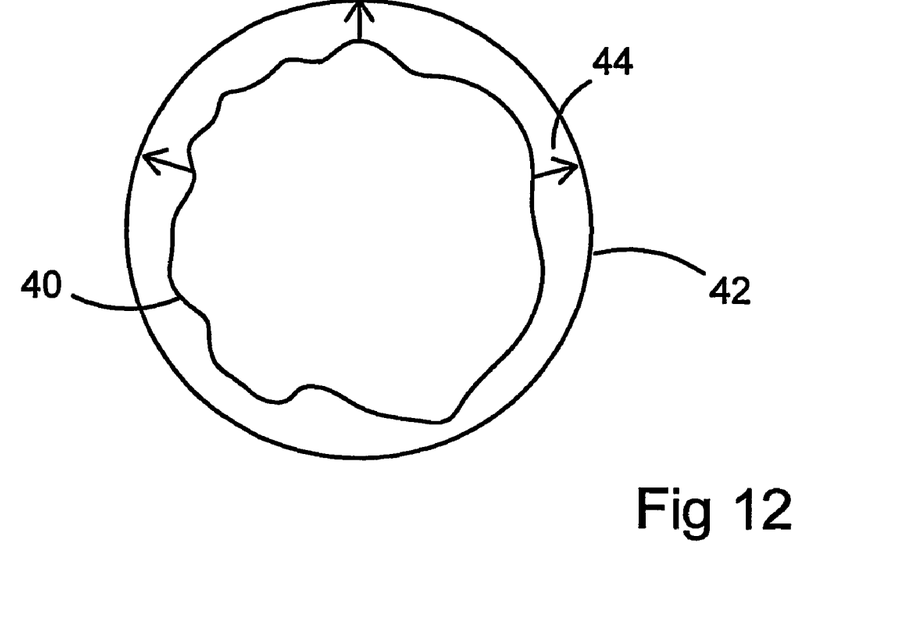
FIG. 12 is a schematic illustration of the dynamic correction vectors.

FIG. 12 illustrates the measurements taken during the fast scan 40 and the actual dimension 42 of the object created by measurement force error correcting the slow scan as previously described.

The dynamic error map has been combined with the measurement force error map or function to create a total feature map. This is done by adding the measurement force error correction vectors 38 around the part illustrated in FIG. 6 with the dynamic error correction vectors around the part to create combined correction vectors 44 illustrated in FIG. 12.

This method has the advantage that as the measurement errors are determined by scanning the object at different probe deflections or different forces, the measurement errors are known for every point on the surface of the object. Thus no interpolation is required.

In a second embodiment of the invention, the measurement force errors and the dynamic errors may be determined in combination. Such a method will now be described with reference to FIGS. 13 and 14.

Figure 13:
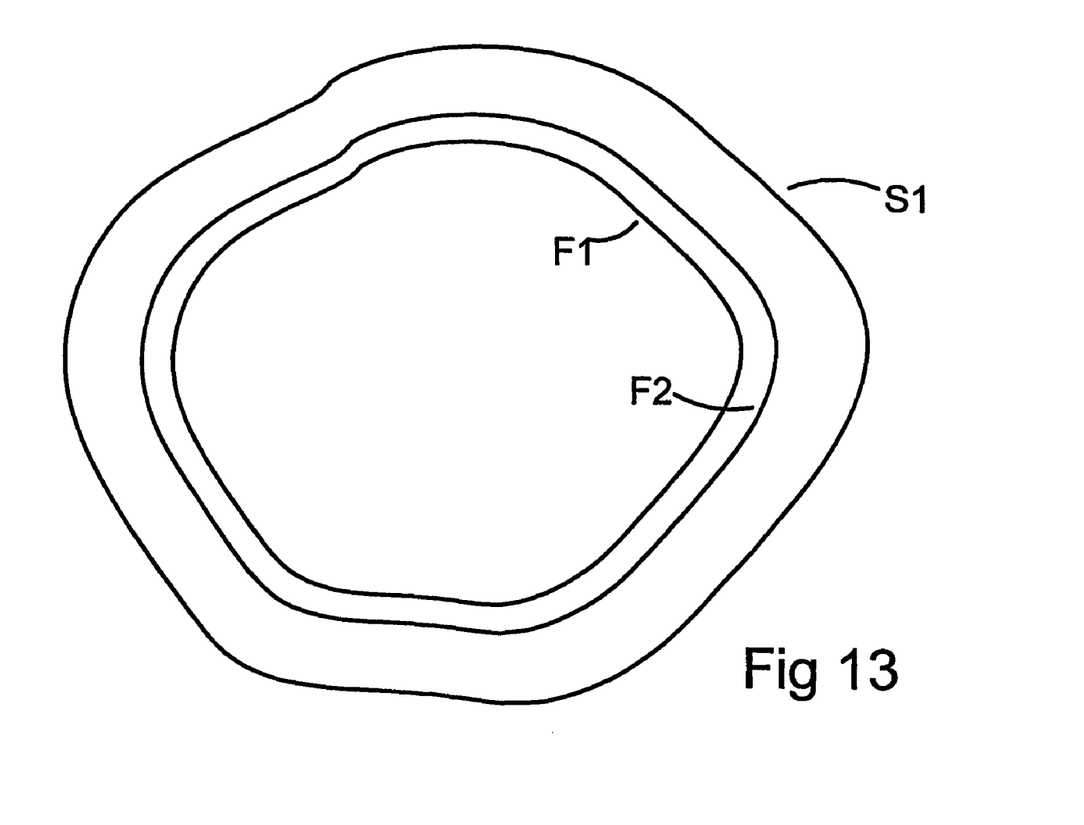
FIG. 13 illustrates the scan profiles during the method of a second embodiment of the invention.

In a first step, an object is scanned at a slow speed for example 10 mm/s with a first deflection, for example 200 μm. FIG. 13 shows the profile of the slow scan S1. The object is then scanned along the same path at a fast speed, for example 100 mm/s and at a second deflection, for example 100 cm. FIG. 13 shows the profile of the fast scan F1. The object is then scanned along the same path at the fast speed 100 mm/s and at the first deflection 200 μm. FIG. 13 shows the profile of the fast scan F2.

Figure 14:
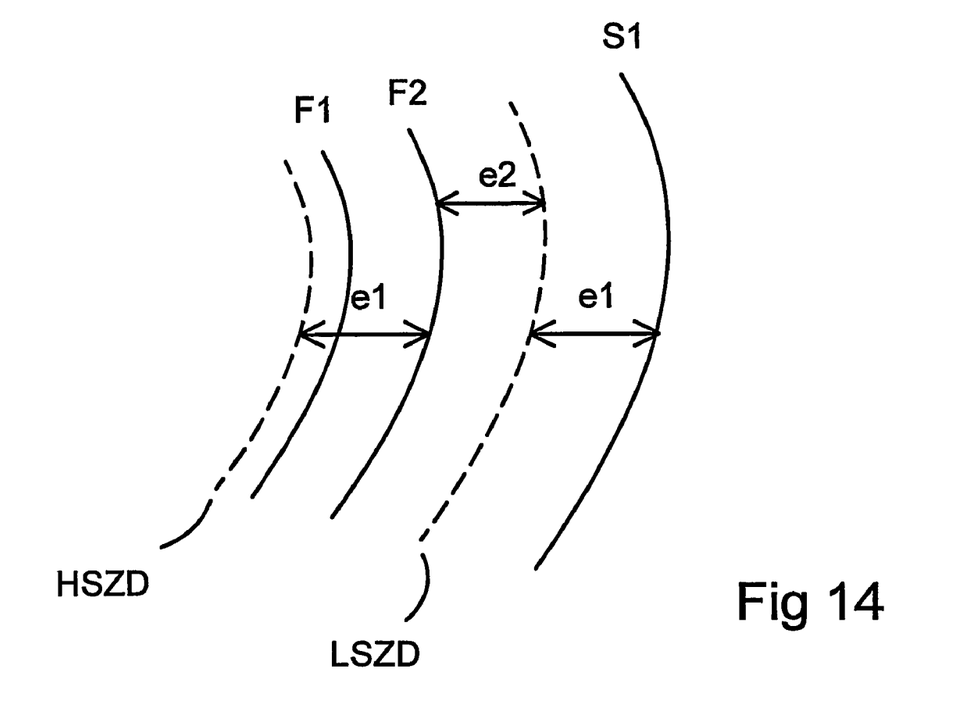
FIG. 14 shows a portion of the scan profiles of FIG. 13.

FIG. 14 shows a portion of the S1, F1 and F2 scan profiles around the object. F1 and F2 are profiles for scans of the same fast speed (100 mm/s) but different deflections (100 μm and 200 μm respectively). By extrapolating to zero deflection, the profile of the object for a high speed (100 mm/s) scan with zero deflection can be determined. This profile is shown as HSZD on FIG. 14. The error due to deflection of the F2 scan may thus be determined. This deflection error is shown as $e_1$, on FIG. 14.

As scans S1 and F2 were carried out with the same probe deflection (200 μm), the deflection error $e_1$, may be applied to the profile of scan S1 to find the profile corresponding to a scan at low speed with zero deflection. This profile is shown as LSZD on FIG. 14 and corresponds to the surface of the object.

The LSZD is now used as a base line. The error between the LSZD baseline and the F2 scan is now determined. This is labelled $e_2$ on FIG. 14. The errors $e_2$ may be stored as a correction map or function.

Subsequent objects may now be measured at a speed and deflection corresponding to scan F2 and corrected using the correction map or function.

This method may be used with a force-measuring probe rather than a deflection-measuring probe. In this case, scans S1 and F2 are carried out at a first probe force and scan F1 is carried out at a second probe force. The two fast scans must then be extrapolated to zero force to determine the high speed zero force profile and thus the error due to force of the F2 scan may be determined.

The measurements of the object during the S1, F1 and F2 scans may be determined by using either a scanning probe or a touch trigger probe. A touch trigger probe may be electronically loaded so that it triggers at a certain force.

Thus during the S1 and F2 scans the probe is loaded to trigger at a first force and during the F1 scan the probe is loaded to trigger at a second force, enabling the two fast scans to extrapolate to zero force.

It is not necessary for the slow scan S1 to have the same stylus deflection or probe force as the fast scan F1. This is because the relationship between stylus deflection/probe force and measurement error is determined at the fast speed from scans F1 and F2, which enables comparison with any stylus deflection/probe force at the slow speed.

Figure 15:
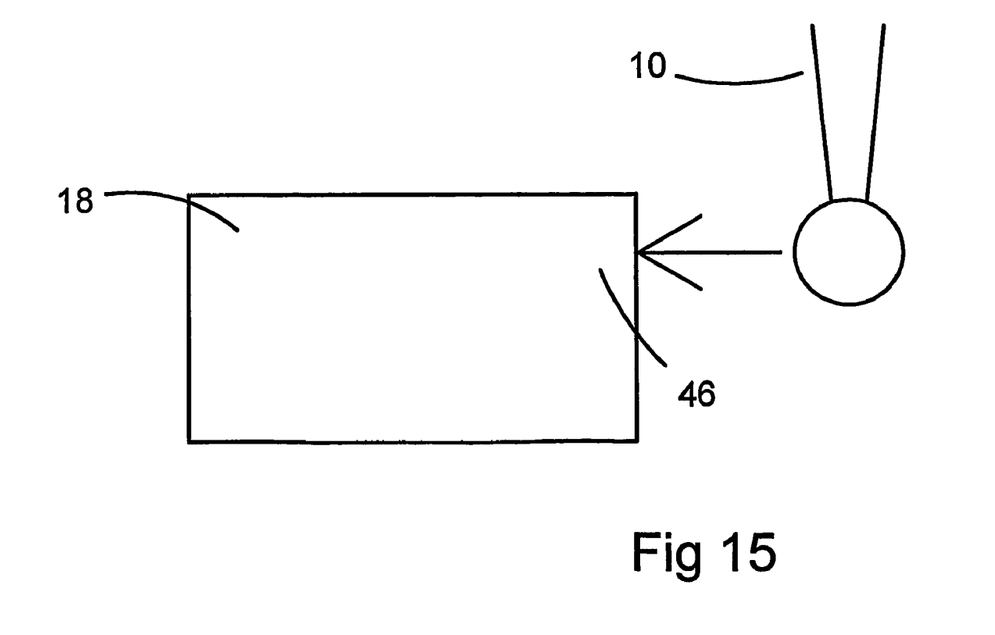
FIG. 15 illustrates a workpiece being measured according to a third embodiment of the invention.

A third embodiment of the invention will now be described with reference to FIG. 15. A stylus 10 of a probe is driven into contact with a surface of an object 18 along a path 46 in a direction normal to the object's surface until a predetermined stylus force has been reached. This step is repeated along the same path for a plurality of different predetermined stylus forces. The measurement data along this path is used to extrapolate back to enable the point which would be measured with zero forces between the stylus and workpiece to be determined. This is the nominal object measurement.

This process is repeated for a selection of datum points around the surface of the object. The data from each of these datum points is used to create an error map as previously described to correct subsequent measurements. Measurements of the surface of the object between the datum points are corrected by interpolating the error map between the datum points.

The invention claimed is:

1. A method of measuring an object on a coordinate positioning apparatus, comprising the following steps, in any suitable order:
   placing a first object on a coordinate positioning apparatus;
   measuring said first object with a workpiece contacting probe to create measurement data of the first object, the measurement data being collected at multiple stylus deflections or probe forces;
   for a plurality of points on the surface of said first object, extrapolating the measurement data to that corresponding to zero stylus deflection or zero probe force;
   creating an error function or map from said measurement data and the extrapolated data;
   measuring subsequent objects at a known stylus deflection or known probe force;
   and using the error function or map to apply an error correction to the measurements of said subsequent objects.

2. A method according to claim 1 wherein the step of measuring the first object with a workpiece contacting probe comprises scanning the first object.

3. A method according to claim 2 wherein the first object is measured at a slow speed.

4. A method according to claim 2 in which the first object is measured at a slow speed, and further comprising the additional steps of:
   measuring said first object with a workpiece contacting probe at a fast speed to create measurement data of the first object, the probe having a known stylus deflection or known probe force;
   comparing the extrapolated measurement data corresponding to zero stylus deflection or zero probe force at the slow speed with the measurement data at the fast speed;
   wherein the error function or map created from the measurement data relates to the measurement data at the fast speed;
   and wherein the subsequent objects are measured at a known stylus deflection or known probe force at the fast speed.

5. A method according to claim 2 in which the first object is measured at a fast speed and further comprising the additional steps of:
   creating a first error function or map from the difference between the measurement data at a predetermined stylus deflection or probe force at said fast speed and the extrapolated to zero data at the fast speed;
   measuring said first object with a workpiece contacting probe at a slow speed to create measurement data of the first object;
   applying the first error function or map to the measurement data created during the slow measurement run;
   wherein said error function or map comprises a second error function or map relating to the difference between the measurement data obtained during the fast measurement at said predetermined known stylus deflection or known probe force and the measurement data corresponding to zero stylus deflection or zero probe force at said slow speed;
   and wherein the subsequent objects are measured at a known stylus deflection or known probe force at the fast speed.

6. A method according to claim 1 wherein the first object is measured at a slow speed.

7. A method according to claim 6 in which the first object is measured at a slow speed, and further comprising the additional steps of:
   measuring said first object with a workpiece contacting probe at a fast speed to create measurement data of the first object, the probe having a known stylus deflection or known probe force;
   comparing the extrapolated measurement data corresponding to zero stylus deflection or zero probe force at the slow speed with the measurement data at the fast speed;
   wherein the error function or map created from the measurement data relates to the measurement data at the fast speed;
   and wherein the subsequent objects are measured at a known stylus deflection or known probe force at the fast speed.

8. A method according to claim 6 in which the first object is measured at a fast speed and further comprising the additional steps of:
   creating a first error function or map from the difference between the measurement data at a predetermined stylus deflection or probe force at said fast speed and the extrapolated to zero data at the fast speed;
   measuring said first object with a workpiece contacting probe at a slow speed to create measurement data of the first object;
   applying the first error function or map to the measurement data created during the slow measurement run;
   wherein said error function or map comprises a second error function or map relating to the difference between the measurement data obtained during the fast measurement at said predetermined known stylus deflection or known probe force and the measurement data corresponding to zero stylus deflection or zero probe force at said slow speed;
   and wherein the subsequent objects are measured at a known stylus deflection or known probe force at the fast speed.

9. A method according to claim 1 in which the first object is measured at a slow speed, and further comprising the additional steps of:
  measuring said first object with a workpiece contacting probe at a fast speed to create measurement data of the first object, the probe having a known stylus deflection or known probe force;
  comparing the extrapolated measurement data corresponding to zero stylus deflection or zero probe force at the slow speed with the measurement data at the fast speed;
  wherein the error function or map created from the measurement data relates to the measurement data at the fast speed;
  and wherein the subsequent objects are measured at a known stylus deflection or known probe force at the fast speed.

10. A method according to claim 9 in which the first object is measured at a fast speed and further comprising the additional steps of:
  creating a first error function or map from the difference between the measurement data at a predetermined stylus deflection or probe force at said fast speed and the extrapolated to zero data at the fast speed;
  measuring said first object with a workpiece contacting probe at a slow speed to create measurement data of the first object;
  applying the first error function or map to the measurement data created during the slow measurement run;
  wherein said error function or map comprises a second error function or map relating to the difference between the measurement data obtained during the fast measurement at said predetermined known stylus deflection or known probe force and the measurement data corresponding to zero stylus deflection or zero probe force at said slow speed;
  and wherein the subsequent objects are measured at a known stylus deflection or known probe force at the fast speed.

11. A method according to claim 1 in which the first object is measured at a fast speed and further comprising the additional steps of:
  creating a first error function or map from the difference between the measurement data at a predetermined stylus deflection or probe force at said fast speed and the extrapolated to zero data at the fast speed;
  measuring said first object with a workpiece contacting probe at a slow speed to create measurement data of the first object;
  applying the first error function or map to the measurement data created during the slow measurement run;
  wherein said error function or map comprises a second error function or map relating to the difference between the measurement data obtained during the fast measurement at said predetermined known stylus deflection or known probe force and the measurement data corresponding to zero stylus deflection or zero probe force at said slow speed;
  and wherein the subsequent objects are measured at a known stylus deflection or known probe force at the fast speed.

12. A method of measuring an object on a coordinate positioning apparatus, comprising the following steps, in any suitable order:
  placing a first object on a coordinate positioning apparatus;
  measuring said first object with a workpiece contacting probe at a slow speed to create measurement data of the first object, the measurement data being collected at multiple stylus deflections or probe forces;
  for a plurality of points on the surface of said first object, extrapolating the measurement data to that corresponding to zero stylus deflection or zero probe force at said slow speed;
  measuring said first object with a workpiece contacting probe at a fast speed to create measurement data of the first object, the probe having a known stylus deflection or known probe force;
  comparing the extrapolated measurement data corresponding to zero stylus deflection or zero probe force at a slow speed with the measurement data at the fast speed;
  creating an error function or map from the comparison of measurement data;
  measuring subsequent objects at a known stylus deflection or known probe force at the fast speed;
  and using the error function or map to apply an error correction to the measurement of said subsequent objects.

13. A method of measuring an object on a coordinate positioning apparatus comprising in any suitable order, the steps of:
  (a) placing a first object on a coordinate positioning apparatus;
  (b) measuring said first object for a measurement run with a workpiece contacting probe at a fast speed to create measurement data of the first object, the measurement data being collected at multiple stylus deflections or probe forces;
  (c) for a plurality of points on the surface of said first object, extrapolating the measurement data from step (b) to that corresponding to zero stylus deflection or zero probe force at the fast speed;
  (d) creating a first error function or map for the relationship between measurement force error and stylus deflection or probe force from the measurement data obtained in step (b) and the extrapolated to zero data at said fast speed in step (c);
  (e) measuring said first object with a workpiece contacting probe at a slow speed to create measurement data of the first object, the probe having a known stylus deflection or known probe force;
  (f) applying the first error function or map of step (d) to the measurement data created during the measurement run in step (e) and thereby determining the measurement data of the first object corresponding to zero stylus deflection or zero probe force at the slow speed;
  (g) creating a second error function or map relating to the relationship between the measurement data obtained at a fast speed for a known stylus deflection or probe force and the measurement data corresponding to zero stylus deflection or zero probe force at said slow speed determined in step (f);
  (h) measuring subsequent objects at a known stylus deflection or known probe force and fast speed; and
  (i) using the second error function or map created in step (g) to apply an error correction to the measurements obtained in step (h).

14. A method of measuring an object on a coordinate positioning apparatus, comprising the steps of:
  placing a first object on a coordinate positioning apparatus;

measuring said first object with a workpiece contacting probe, to create measurement data of the first object, the measurement data being collected at multiple probe forces;

for a plurality of points on the surface of said first object, extrapolating the measurement data to that corresponding to zero probe force;

creating an error function or map;

measuring subsequent objects at a known probe force; and using the error map to apply an error correction to the measurements of the subsequent objects.

15. A method of measuring an object on a coordinate positioning apparatus, comprising the following steps in any suitable order:

placing a first object on a coordinate positioning apparatus;

measuring said first object at a first speed, comprising one of a fast and slow speed, with a workpiece contacting probe to create measurement data of the first object, the measurement data being collected at multiple stylus deflections or probe forces;

for a plurality of points on the surface of said first object, extrapolating the measurement data to that corresponding to zero stylus deflection or zero probe force and thereby zero probing force error;

measuring said first object at a second speed, comprising the other of a fast speed and a slow speed, with a workpiece contacting probe to create measurement data of the first object;

using the extrapolated measurement data of the first object at the first speed and the measurement data of the first object taken at the second speed to determine the measurements of the first object corresponding to zero probing force error and zero dynamic error;

creating an error function or error map relating the measurements of the first object corresponding to zero probing force error and zero dynamic error and the measurement data of the first object at a fast speed and given stylus deflection or probe force;

measuring subsequent objects at a know stylus deflection or known probe force at the fast speed; and using the error function or map to apply an error correction to the measurements of said subsequent objects.

* * * * *